United States Patent
Boss et al.

(10) Patent No.: US 10,068,356 B2
(45) Date of Patent: Sep. 4, 2018

(54) SYNCHRONIZED MAPS IN EBOOKS USING VIRTUAL GPS CHANNELS

(71) Applicant: International Business Machines Corporation, Armonk, NY (US)

(72) Inventors: Gregory J. Boss, Saginaw, MI (US); Andrew R. Jones, Round Rock, TX (US); Kevin C. McConnell, Austin, TX (US); John E. Moore, Jr., Brownsburg, IN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 210 days.

(21) Appl. No.: 14/929,903

(22) Filed: Nov. 2, 2015

(65) Prior Publication Data
US 2017/0124733 A1 May 4, 2017

(51) Int. Cl.
| | |
|---|---|
| *G06T 11/20* | (2006.01) |
| *G01S 19/13* | (2010.01) |
| *G06T 13/80* | (2011.01) |
| *G06T 7/00* | (2017.01) |
| *G06T 7/60* | (2017.01) |
| *G06F 17/27* | (2006.01) |

(52) U.S. Cl.
CPC ............ *G06T 11/20* (2013.01); *G01S 19/13* (2013.01); *G06F 17/2705* (2013.01); *G06T 7/004* (2013.01); *G06T 7/60* (2013.01); *G06T 13/80* (2013.01)

(58) Field of Classification Search
CPC ............ G06F 3/0483; G06F 15/0291; G09G 2380/14; G06T 11/20; G06T 11/203–11/206; G06T 13/80
See application file for complete search history.

(56) References Cited

U.S. PATENT DOCUMENTS

| | | | |
|---|---|---|---|
| 9,047,283 B1 * | 6/2015 | Zhang | .............. G06F 17/30663 |
| 9,424,107 B1 * | 8/2016 | Ward | ........................ G06F 9/542 |
| 2011/0167350 A1 | 7/2011 | Hoellwarth | |
| 2012/0137246 A1 * | 5/2012 | Pyo | ........................ G01C 21/362 |
| | | | 715/776 |
| 2013/0104072 A1 * | 4/2013 | Havard | .................... G06F 3/048 |
| | | | 715/781 |
| 2013/0290871 A1 | 10/2013 | Jordan et al. | |

(Continued)

OTHER PUBLICATIONS

Courtney Hampson, A Method or System for Identifying the Context of an Event, and Recommending a Cover Photo for the Event Based on the Context, (ABSTRACT)—IP.com, IPCOM000236528D, May 1, 2014.

(Continued)

*Primary Examiner* — Charles Tseng
(74) *Attorney, Agent, or Firm* — Cantor Colburn LLP

(57) ABSTRACT

According to some embodiments, a computer-implemented method for displaying a created map for a plurality of characters in a story is described. The computer-implemented method may include creating a map for a story plot, receiving an indication of a user position in the story plot, determining a set of coordinates on the map for a character in the story plot with respect to the user position, and displaying the map with the character in the story plot represented on the map according to the set of coordinates.

14 Claims, 6 Drawing Sheets

(56) References Cited

U.S. PATENT DOCUMENTS

| | | | |
|---|---|---|---|
| 2013/0311870 A1* | 11/2013 | Worsley | G06F 17/30952 715/234 |
| 2013/0321390 A1* | 12/2013 | Latta | G06T 11/00 345/419 |
| 2014/0019893 A1* | 1/2014 | Gudmundsson | G06F 17/30011 715/764 |
| 2014/0038708 A1* | 2/2014 | Davison | A63F 13/12 463/31 |
| 2014/0039887 A1* | 2/2014 | Dzik | G10L 15/26 704/235 |
| 2014/0244155 A1* | 8/2014 | Abe | G01C 21/00 701/410 |
| 2015/0095749 A1* | 4/2015 | Lehtiniemi | G06F 17/211 715/201 |
| 2016/0266740 A1* | 9/2016 | Glasgow | G06Q 10/101 |

OTHER PUBLICATIONS

Fantasy-Faction.com, "A Game of Thrones: Enhanced Edition Fantasy-Faction", http://fantasy-faction.com/2012/got-enhanced; retrieved Apr. 8, 2016; 7 pages.

itunes.apple.com, "Marvin—eBook reader for epub",https://itunes.apple.com/us/app/marvin-ebook-reader-for-epub/id667361209?mt=8; retrieved Apr. 8, 2016; 2 pages.

\* cited by examiner

SYNCHRONIZED MAPS IN EBOOKS USING VIRTUAL GPS CHANNELS

BACKGROUND

The present disclosure relates to creation and presentation of synchronized maps in eBooks, and more specifically, to creation and presentation of synchronized social maps in eBooks using virtual GPS channels.

In literature, we often see very complex story lines that entail the movement of characters from one location to another throughout the work. In some story plots character movement may be simple and not a key element of the story. In other literature, character movements may be highly complex and deeply integrated into the storyline. An understanding the location and movement of the characters may be a key factor to full enjoyment of the literature and can greatly enhance a reader's experience of the story.

Authors often include maps that illustrate the broad setting of the story, but these maps may generally be static. For the reader, especially in long epic novels, trilogies, series, etc., it may be difficult to follow the location of main characters in the story line. Additionally, for the author, when writing complex works it can be a difficult task to maintain consistency throughout the work with respect to a character's location, especially if the author has a strong desire to maintain a high level of accuracy. For example, an author may want to ensure that the timeline of the story matches the reality of the spatial relationship between specific settings and locations in the storyline. If a character travels from one location to another in the plot, the author may want to determine whether the character can feasibly travel the distance from point A to point B in the time described in the text with respect to the map of the book.

SUMMARY

According to some embodiments, a computer-implemented method for displaying a created map for a plurality of characters in a story is described. The computer-implemented method may include creating a map for a story plot, receiving an indication of a user position in the story plot, determining a set of coordinates on the map for a character in the story plot with respect to the user position, and displaying the map with the character in the story plot represented on the map according to the set of coordinates.

In other exemplary embodiments, a system for displaying a created map for a plurality of characters in a story is described. The system may include a processor configured to create a map for a story plot, receive an indication of a user position in the story plot, determine a set of coordinates on the map for a character in the story plot with respect to the user position, and display the map with the character in the story plot represented on the map according to the set of coordinates In yet other exemplary embodiments, a non-transitory computer-readable storage medium is described. The non-transitory computer-readable storage medium may store computer-executable instructions to perform a method. The method may include creating a map for a story plot, receiving an indication of a user position in the story plot, determining a set of coordinates on the map for a character in the story plot with respect to the user position, and displaying the map with the character in the story plot represented on the map according to the set of coordinates.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
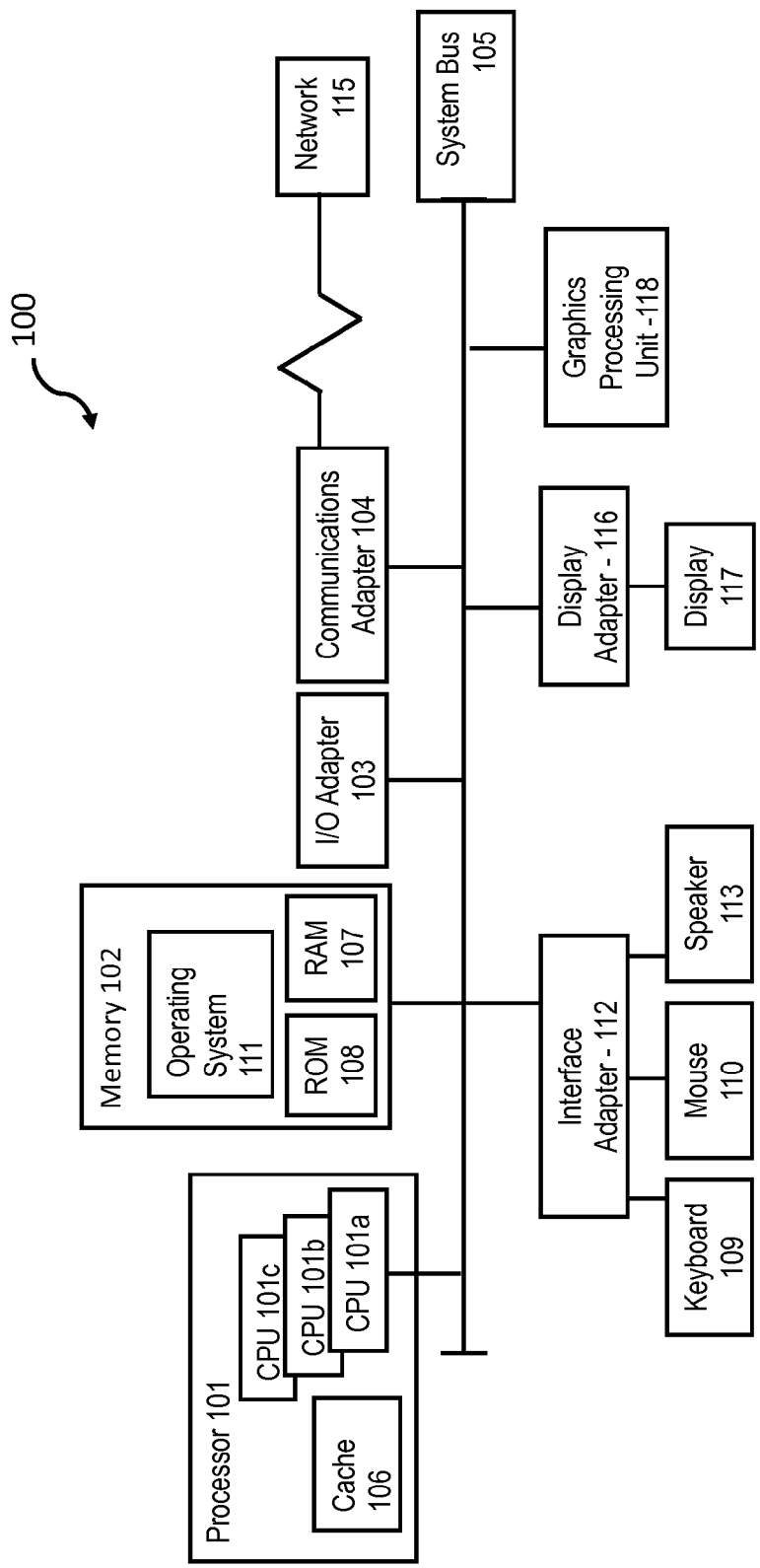
FIG. 1 illustrates a block diagram of a computer system for use in practicing the teachings herein.

FIG. 1 illustrates a block diagram of a computer system 100 (hereafter "computer 100") for use in practicing the embodiments described herein. The methods described herein can be implemented in hardware, software (e.g., firmware), or a combination thereof. In an exemplary embodiment, the methods described herein are implemented in hardware, and may be part of the microprocessor of a special or general-purpose digital computer, such as a personal computer, workstation, minicomputer, or mainframe computer. Computer 100 therefore can embody a general-purpose computer. In another exemplary embodiment, the methods described herein are implemented as part of a mobile device, such as, for example, a mobile phone, a personal data assistant (PDA), a tablet computer, etc.

In an exemplary embodiment, in terms of hardware architecture, as shown in FIG. 1, the computer 100 includes processor 101. Computer 100 also includes memory 102 coupled to processor 101, and one or more input and/or output (I/O) adaptors 103, that may be communicatively coupled via a local system bus 105. Memory 102 may be operatively coupled to one or more internal or external memory devices. Communications adaptor 104 may be operatively connect computer 100 to one or more networks 115. System bus 105 may also connect one or more user interfaces via interface adaptor 112. Interface adaptor 112 may connect a plurality of user interfaces to computer 100 including, for example, keyboard 109, mouse 110, speaker 113, etc. System bus 105 may also connect display adaptor 116 and display 117 to processor 101. Processor 101 may also be operatively connected to graphical processing unit 118.

Processor 101 is a hardware device for executing hardware instructions or software, particularly that stored in a non-transitory computer-readable memory (e.g., memory 102). Processor 101 can be any custom made or commercially available processor, a central processing unit (CPU), a plurality of CPUs, for example, CPU 101a-101c, an auxiliary processor among several other processors associated with the computer 100, a semiconductor based microprocessor (in the form of a microchip or chip set), a macroprocessor, or generally any device for executing instructions. Processor 101 can include a memory cache 106, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 106 may be organized as a hierarchy of more cache levels (L1, L2, etc.).

Memory 102 can include random access memory (RAM) 107 and read only memory (ROM) 108. RAM 107 can be any one or combination of volatile memory elements (e.g., DRAM, SRAM, SDRAM, etc.). ROM 108 can include any one or more nonvolatile memory elements (e.g., erasable programmable read only memory (EPROM), flash memory, electronically erasable programmable read only memory (EEPROM), programmable read only memory (PROM), tape, compact disc read only memory (CD-ROM), disk, cartridge, cassette or the like, etc.). Moreover, memory 102 may incorporate electronic, magnetic, optical, and/or other types of non-transitory computer-readable storage media. Note that the memory 102 can have a distributed architecture, where various components are situated remote from one another, but can be accessed by the processor 101.

The instructions in memory 102 may include one or more separate programs, each of which comprises an ordered listing of computer-executable instructions for implementing logical functions. In the example of FIG. 1, the instructions in memory 102 may include a suitable operating system 111. Operating system 111 can control the execution of other computer programs and provides scheduling, input-output control, file and data management, memory management, and communication control and related services.

Input/output adaptor 103 can be, for example but not limited to, one or more buses or other wired or wireless connections, as is known in the art. The input/output adaptor 103 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

Interface adaptor 112 may be configured to operatively connect one or more I/O devices to computer 100. For example, interface adaptor 112 may connect a conventional keyboard 109 and mouse 110. Other output devices, e.g., speaker 113 may be operatively connected to interface adaptor 112. Other output devices may also be included, although not shown. For example, devices may include but are not limited to a printer, a scanner, microphone, and/or the like. Finally, the I/O devices connectable to interface adaptor 112 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like.

Computer 100 can further include display adaptor 116 coupled to one or more displays 117. In an exemplary embodiment, computer 100 can further include communications adaptor 104 for coupling to a network 115.

Network 115 can be an IP-based network for communication between computer 100 and any external device. Network 115 transmits and receives data between computer 100 and devices and/or systems external to computer 100. In an exemplary embodiment, network 115 can be a managed IP network administered by a service provider. Network 115 may be a network internal to an aircraft, such as, for example, an avionics network, etc. Network 115 may be implemented in a wireless fashion, e.g., using wireless protocols and technologies, such as WiFi, WiMax, etc. Network 115 may also be a wired network, e.g., an Ethernet network, an ARINC 429 network, a CAN, etc., having any wired connectivity including, e.g., an RS232 connection, R5422 connection, etc. Network 115 can also be a packet-switched network such as a local area network, wide area network, metropolitan area network, Internet network, or other similar type of network environment. The network 115 may be a fixed wireless network, a wireless local area network (LAN), a wireless wide area network (WAN) a personal area network (PAN), a virtual private network (VPN), intranet or other suitable network system.

If computer 100 is a PC, workstation, laptop, tablet computer and/or the like, the instructions in the memory 102 may further include a basic input output system (BIOS) (omitted for simplicity). The BIOS is a set of essential routines that initialize and test hardware at startup, start operating system 111, and support the transfer of data among the operatively connected hardware devices. The BIOS is stored in ROM 108 so that the BIOS can be executed when computer 100 is activated. When computer 100 is in operation, processor 101 may be configured to execute instructions stored within the memory 102, to communicate data to and from the memory 102, and to generally control operations of the computer 100 pursuant to the instructions.

Figure 2:
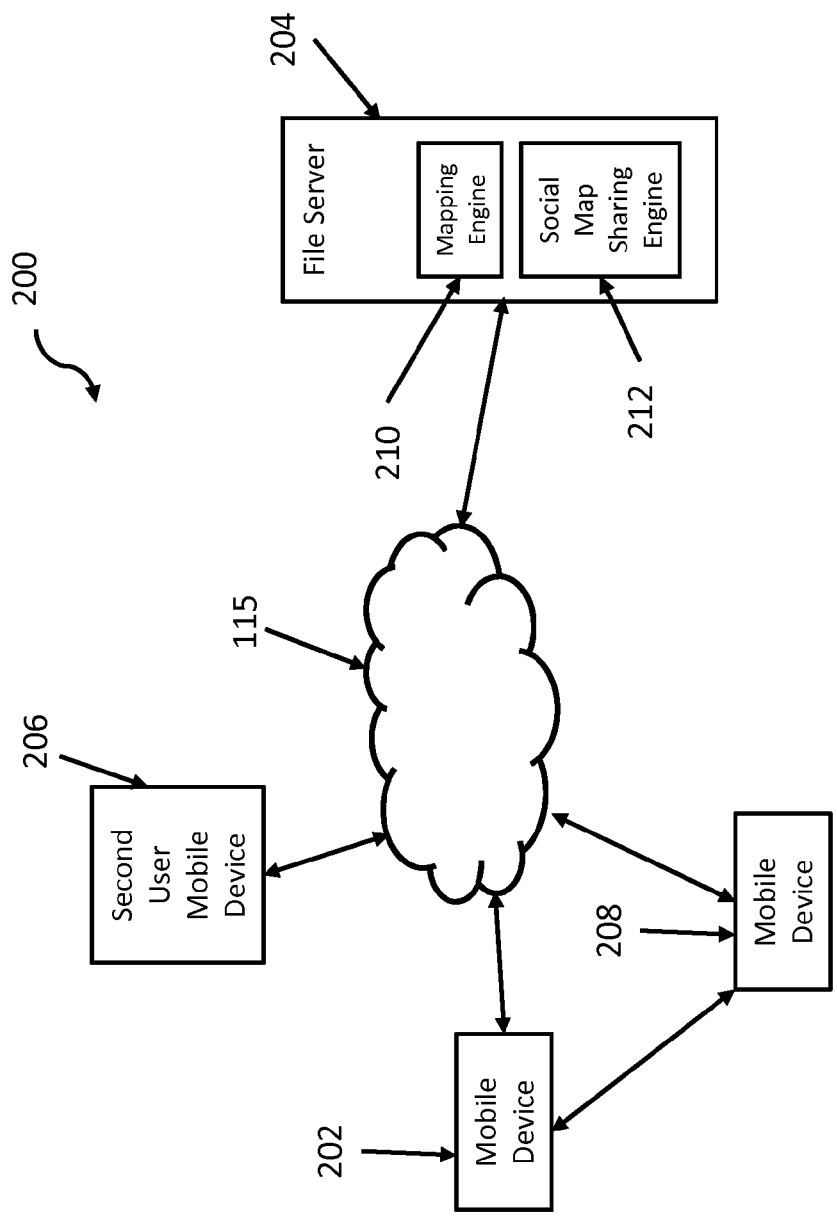
FIG. 2 depicts a computing environment for performing a method for displaying a created map for a plurality of characters in a story in accordance with an exemplary embodiment.

Referring now to FIG. 2, an exemplary computing environment 200 for performing a method for displaying a created map for a plurality of characters in a story is described, in accordance with an exemplary embodiment. Computing environment 200 may include a mobile device 202 operatively connected to at least one file server 204 through a network 115. Computing environment 200 may further include a second mobile device 208, which may also be connected to file server 204 via network 115, and/or be operatively connected to mobile device 202. Computing environment 200 may further include a second user mobile device 206 in communication with file server 204 and/or devices 202 and 208.

In some aspects, mobile devices 202 and 208 may be a laptop, an eBook reader, a tablet computer, smartphone, or the like. Mobile devices 202 and 208 may be operable to read eBooks, which may include photos, text, maps, animations, etc. Mobile device 208 may be configured to communicate with mobile device 202 via wired or wireless communication. For example, device 208 may communicate with device 202 via Bluetooth communication, NFC, etc. For example, device 202 may be operative as an eBook reader, and mobile device may be operative as a map display unit. In other aspects, mobile device 202 and/or 208 may access social media websites, share interactive information regarding created maps, character placement on the created maps with respect to one or more saved bookmarks, etc.

File server 204 may include a mapping engine 210, which may be configured to create maps for a story plot, receive and send indications of a user position in a story plot of an eBook (e.g., save and send eBook bookmark information, etc.), parse eBook text or other text for information indicative of locations mentioned in story plots, make associations between text of an eBook and stored maps associated with eBook story plots, etc. Mapping engine 210 may also be configured to receive, save and/or create digital maps, and to add coordinate values to locations on a virtual (e.g., digital) map. Although some embodiments described herein show mapping engine 210 operative as part of file server 204, mapping engine 210 may alternatively be located at mobile device 202, 206, and/or 208, and yet be operatively connected to file server 204.

File server 204 may further include social map sharing engine 212 that may be configured to send and receive user input regarding bookmark information respective to a plurality of users. Sharing engine 212 may be configured to interact with social media websites to post user information regarding eBook maps, bookmarks, comments regarding story plots, map animations, etc. Sharing engine 212 may be further configured to send and receive map information including, for example, virtual GPS (vGPS) information indicative of character positions on a map corresponding to respective eBook portions (e.g., positions with respect to paragraphs, sentences, chapters, etc.). In other aspects, social map sharing engine 212 may be further configured to share avatar (digital character representations) information between social media users, where individual users may create and share digital avatars of their favorite eBook characters.

In some embodiments, social map sharing engine 212 may include an animation tool configured to animate vGPS channel information such that created avatars can move in an animated way from one location on a map to another. For example, sharing engine 212 may provide a character creation tool configured to create a character representation from a story plot. In some aspects, sharing engine 212 may provide means for sharing map information with users on one or more other devices. For example, a second user mobile device 206 may be one or more devices configured similar to mobile devices 202 and/or 208, but operated by one or more second users (not shown).

Literature such as novels, short stories, etc., often includes complicated story plots having multiple characters in action and/or interacting at various locations of real or imaginary maps. Some books may include a map of a real or imaginary setting for the characters of the story plot. At times, it may be difficult for a reader to keep character locations in mind as they read the book, even with the inclusion of a static map. In other aspects, when authors write complicated storylines, it may be difficult for the writer to track and manage character locations throughout the storyline as she is drafting the story. It may be advantageous, therefore, to provide systems and methods for creating interactive virtual maps configured to display user positions during a user's interaction with an eBook.

A virtual map may be configured to create digital maps and display one or more character locations, which may be saved in a data structure either locally on the mobile device or on a file server (e.g., file server 204). According to some embodiments, a mapping system that may include a mapping engine 210 may be configured to create virtual GPS (vGPS) maps using "channels" or layers of data. In some aspects, the primary channel/layer may be the text of the book. Mapping engine 210 may create a virtual GPS channel (vGPS channel) for each of a plurality of characters in a story plot. In some aspects, the data in these channels may include coordinates of a respective character with respect to positions in the book and/or storyline. For example, each sentence or paragraph indicating a locational position for a character in the story plot may include metadata and/or lookup table data (e.g., vGPS channel information) having map coordinate information for a particular story plot character. In some aspects, the systems and methods described herein may associate a virtual map with vGPS channels (which may include location information similar to GPS coordinates). In other aspects, the text of a work may be a text channel or t-channel. In some embodiments, vGPS data may include t-channel information.

Figure 3:
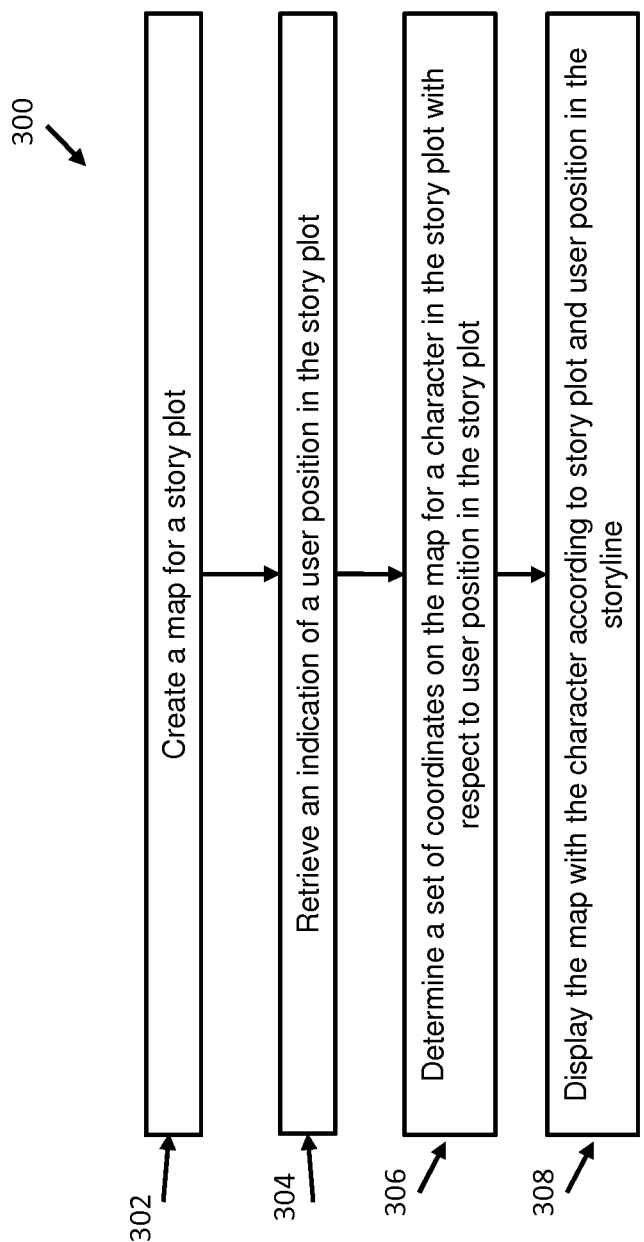
FIG. 3 depicts a method for displaying a created map for a plurality of characters in a story in accordance with an exemplary embodiment.

Embodiments of the present disclosure may include systems and devices for authoring literature for use with an interactive eBook map, systems and devices for creating the interactive eBook map, systems and devices for creating and displaying the character positions in a story plot on an eBook map, and systems and devices for automatic compilation of vGPS channel information for characters in existing electronic literature. Some aspects may also include systems and devices for interactive sharing of vGPS channel information via social media. FIG. 3 considers a method for displaying a crated map while reading an eBook.

Referring now to FIG. 3, a method 300 for displaying a created map for a plurality of characters in a story is depicted, in accordance with an exemplary embodiment. As shown at block 302, mapping engine 210 may create a map for a story plot by assigning coordinates to one or more key portions of a digital map where the key portions are indicative of particular locations in the story plot. In some aspects, a digital map may be a map of a real or imaginary setting or location. For example, a digital map may be a map of a castle, a map of an imaginary forest, a real map of Europe, etc. The digital map may be associated with a story plot in literature embodied as an eBook, text or other digital literature.

In some aspects assigning coordinates to the digital map locations may be performed by an author during the writing process using an interactive tool described in an embodiment herein. In other aspects, mapping engine 210 may automatically detect references in the text with respect to character locations. Accordingly, the digital map locations may be automatically compiled as vGPS channel information. The vGPS information may associate map positions of characters in the form of map coordinates with portions of the eBook, text, literature, etc. In some aspects, mapping engine 210 may compile virtual GPS data for a plurality of a character based on a determined relevance to the eBook portion. For example, in some aspects, mapping engine 210 may determine whether a portion of an eBook (e.g., a sentence, a paragraph, etc.) contains information placing a particular character at a specific position on the map. Accordingly, mapping engine 210 may determine whether the eBook portion has a relevance to the character in the story plot with respect to a map position and create locational data for a character in the form of vGPS data.

In some aspects, mapping engine 210 may store vGPS information indicative of the character, the map position and the eBook portion containing the determined relevant information. The vGPS location may be stored on file server 204 as compiled vGPS data. The compiled vGPS data may map a GPS channel for a character from the beginning of the eBook through the end of the eBook. For example, vGPS location information may be a lookup table, a database and/or the like.

As shown at block 304, in some embodiments, mapping engine 210 may retrieve an indication of a user position in the story plot. In some aspects, the user position in the story plot may include a page number or sentence number, which may be associated with a particular eBook. For example, during the authoring process, the author may associate a character coordinate set indicative of a character's position on a map with a particular page number and/or a sentence number corresponding to the place in the story. The association, which may be saved as vGPS data on file server 204, may include a work name/identification, a character name, a sentence or paragraph identification, and a user identification.

When mapping engine 210 determines that the user has reached a portion of the eBook having vGPS data, mapping engine may determine the coordinates on the map for the character. Accordingly, when mapping engine 210 determines that the user has reached that page in the story plot (e.g., by determining that a page is opened sequentially from a previous page), then mapping engine 310 may determine a set of coordinates on the map for a character in the story plot with respect to the user position, as shown in block 306. In some aspects, mapping engine 310 may receive an indication from mobile device 202 of a user's position (e.g., through bookmark identification, a page number, a sentence number, etc.) in an eBook. Mapping engine 210 may access a unique record indicative of a vGPS information associated with a known character's vGPS channel information.

As shown at block 308, mapping engine 310 may display the map on the user's device, where the map includes an overlay of the character (e.g., an avatar or symbol of the character). The displayed character may be positioned on the map according to the character's position in the story plot, which may be specified as vGPS data. In other aspects, mapping engine 210 may provide vGPS information requested by mobile device 202, and mobile device 202 may draw the map on a display (e.g., display 117).

In some aspects, the interactive eBook may be configured to output a map from any point in the text using a pre-defined gesture or similar method (click on a link, click on an icon, etc.). Alternately, in other embodiments, mobile device 202 may display the map on a secondary screen or device (e.g., mobile device 208), which may be kept in sync with the current eBook reading location. The map may be dynamically drawn using the last known location of the characters based upon the current reading position of the eBook. Mapping engine 210 may output avatars (or the like) on top of the map, which may represent the characters and their current location on the map based upon the data in the vGPS channel provided by mapping engine 210. Mapping engine 210 may monitor user progress through the novel, determine, based on vGPS data, whether one or more character positions have changed on the virtual map based on the user's position in the novel, and change the character's position on the map accordingly.

As described thus far, the vGPS information may be directly correlated to a virtual map of the story plot. For example, an author may create an interactive map using a map creation utility, as described according to some embodiments herein. In other aspects, mapping engine 210 may automatically generate the vGPS information on an existing work of literature.

Figure 4:
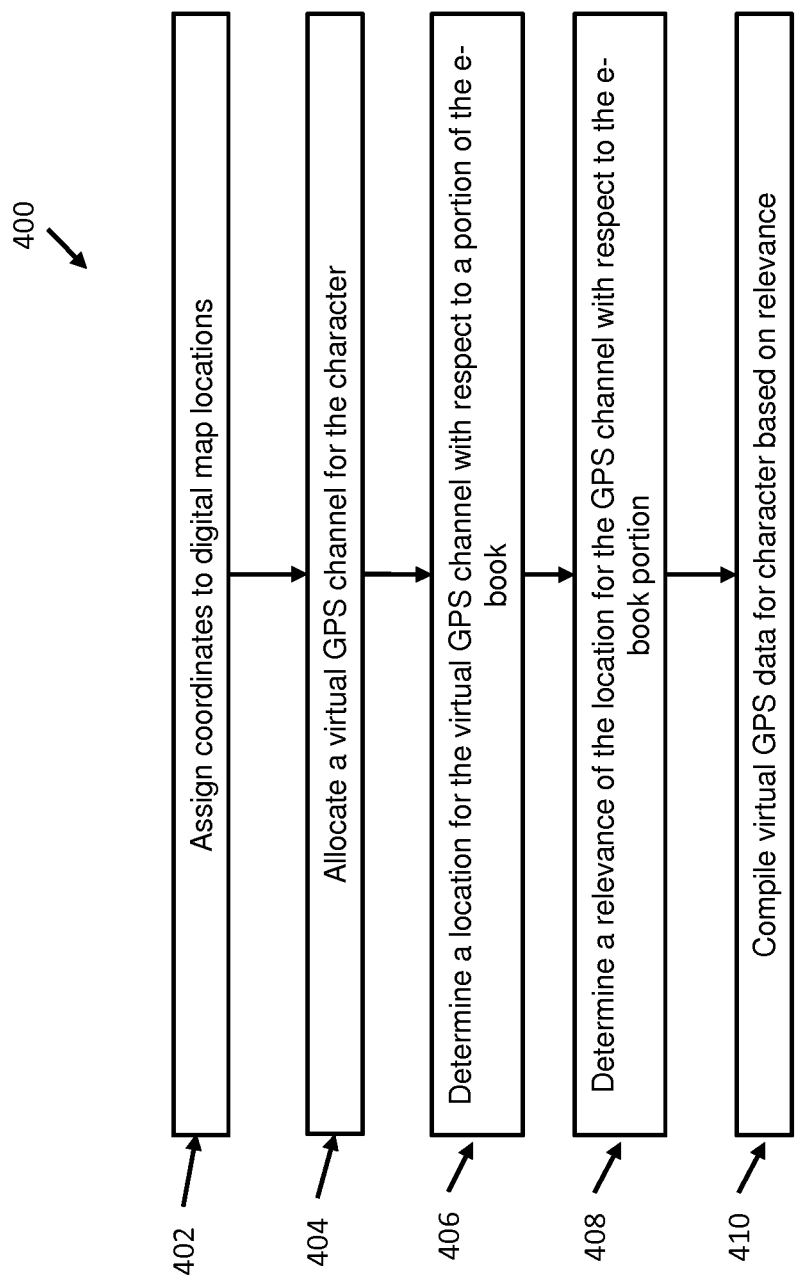
FIG. 4 depicts a flow diagram of a method for creating a map of character positions in a story plot in accordance with an exemplary embodiment.

Referring now to FIG. 4 a flow diagram of a method 400 for creating a map of character positions in a story plot is depicted, in accordance with an exemplary embodiment. Referring now to FIG. 4, at block 402 mapping engine 210 may assign coordinates to digital map locations. In some aspects, mapping engine 210 may prompt for and receive coordinates associated with a digital map. In other aspects, mapping engine 210 may automatically assign a grid of coordinates to a digital map.

As shown at block 404, mapping engine 210 may allocate a vGPS channel for the character. A vGPS channel may include a character identifier, e.g., a name, a numerical identifier associated with a character, etc. The vGPS channel information may further include coordinates associated with the digital map, and a plurality of unique sentences or paragraphs identifiers that identify positions of text with respect to the overall work.

As shown at block 406, mapping engine 210 may determine a location for the vGPS channel with respect to a portion of the eBook. For example, mapping engine 210 may request a sentence identifier and receive the input. Mapping engine 210 may save a record of the vGPS channel information to a memory in file server 204.

At block 408, mapping engine 210 may determine a relevance of the location for the vGPS channel with respect to the eBook portion. For example, mapping engine 210 may output a prompt for user input indicative of vGPS coordinates for a particular channel (e.g., a character location in the story plot). Accordingly, a user may input information indicative of a relevant position for a character associated with the vGPS channel. Mapping engine 210 may associate the vGPS coordinate location with the eBook portion, and save the record to memory.

As shown at block 410, mapping engine 210 may compile the vGPS data for the character based on the relevance to the portion of the eBook. Compiling the information may include associating a plurality of vGPS channel information (e.g., in connection with a plurality of characters) with unique sentence identifiers for the eBook. A sentence identifier may include a unique number for each sentence identifying that sentence with respect to the work as a whole.

Figure 5:
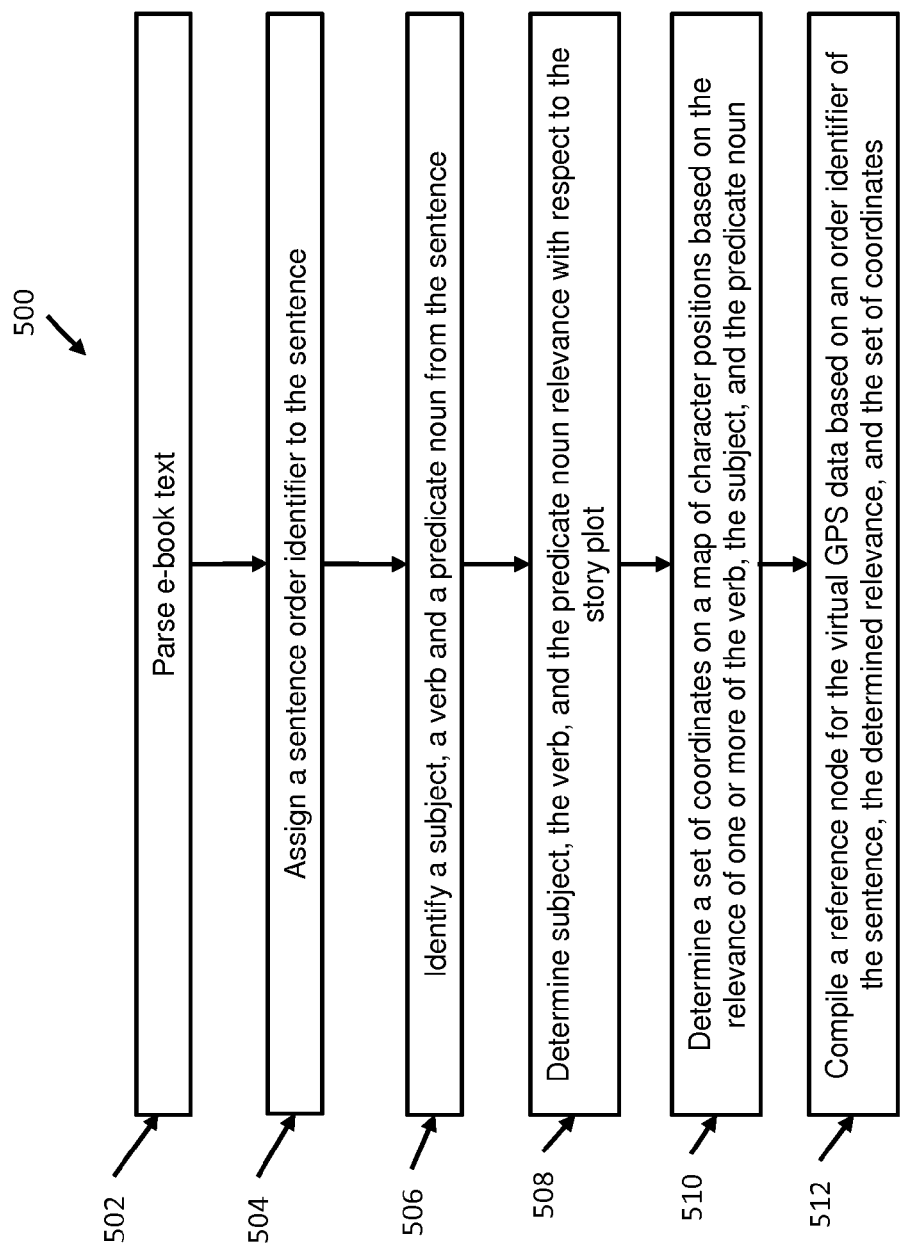
FIG. 5 depicts a flow diagram of a method for compiling virtual GPS data for a plurality of characters in a story plot in accordance with an exemplary embodiment.

In some aspects, it may be advantageous to provide an automatic method for compiling vGPS data for characters in an existing work of literature. In some embodiments, mapping engine 210 may include a text parser that configured to parse the text of an existing eBook or other literature and automatically generate the vGPS location data for each character. There exists today text parsers that are able to identify the key parts of a sentence based upon the language syntax. Using to text parser and a lookup table indicative of key locations associated with vGPS coordinates, the vGPS-channel data may be automatically generated. For example, mapping engine 210 may parse the basic sentence of "Bob went to the Winn Dixie" could be parsed and would identify "Bob" as the subject of the verb "went" and the predicate noun of "Winn Dixie." In some aspects, mapping engine 210 may look up Winn Dixie in a key locations table, retrieve the vGPS coordinate(s) and place that value into the character Bob's vGPS-channel data. FIG. 5 depicts a method 500 for compiling vGPS data for a plurality of characters in a story plot of an eBook, in accordance with an exemplary embodiment.

Figure 6:
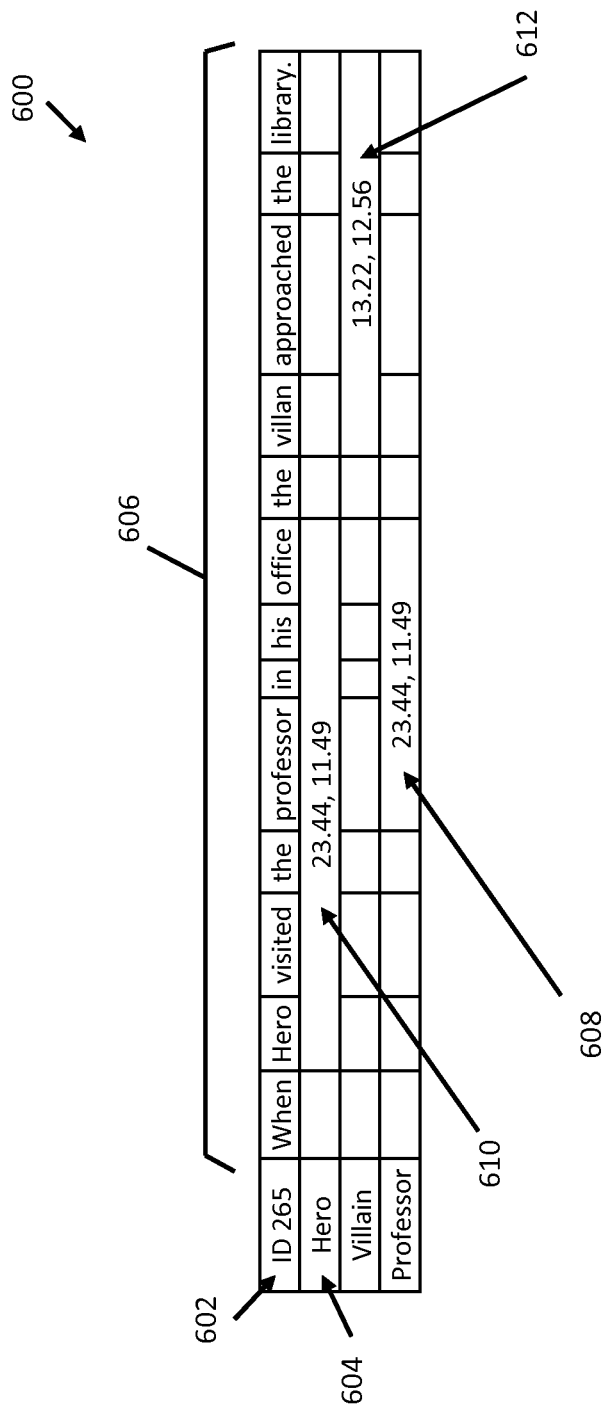
FIG. 6 depicts a diagram of compiled vGPS data in accordance with an exemplary embodiment.

Referring now to FIG. 5, as shown at block 502, mapping engine 210 may parse the text of an eBook to determine key parts of each sentence in the text. FIG. 6 depicts a diagram of compiled vGPS data.

Referring briefly to FIG. 6, compiled vGPS data 600 are depicted, in accordance with an exemplary embodiment. Compiled vGPS data 600 may include a unique sentence identifier (ID) 602, at least one character ID 604, a structure of parsed words 606, and vGPS coordinates 608, 610, and 612.

In some embodiments, mapping engine 210 may parse the text of an eBook to determine the relevance of key words in each sentence. As shown at block 606, the words "When Hero visited the professor in his office the villain approached the library" are depicted as an exemplary parsed sentence. In some aspects, each word of the sentence may be considered individually by mapping engine 210, as shown in compiled vGPS data 600.

Referring again to FIG. 5, as shown at block 504, mapping engine 210 may assign a sentence order ID 602 to a parsed sentence 606. At block 506, mapping engine 210 may identify key terms indicative of relevant information for placing a character at a location on the map. For example, mapping engine 202 may locate a subject, a verb, and a predicate noun from the sentence 606 if the sentence elements are present in the sentence. Accordingly, as shown at block 508, mapping engine 210 may determine whether the key elements are relevant with respect to the story plot.

Accordingly, mapping engine 210 may determine whether the subject references a character in the story plot or a character position on the map, determine whether the verb references a change of the character position, and determine whether the predicate is indicative of a change of the character position.

In some aspects, as shown at block 510, mapping engine 210 may determine one or more sets of coordinates on a map of character positions based on the determined relevance of one or more of the verb, the subject and/or the predicate noun. For example, the sentence fragment "hero visited the professor in his office" can indicate that the character "Hero" is located at office the character "Professor." This connection may correspond to the portion of the eBook uniquely identified as sentence ID 602. The sentence fragment "Professor in his office" may indicate that the character Professor is located at the coordinates 610 representing "Professor's office at sentence ID 602. Similarly, the character Villain may be placed at or near the place "library" at sentence ID 602. Accordingly, vGPS data 600 may uniquely record information determined by mapping engine 210 as relevant to the story plot.

As shown at block 512, mapping engine 210 may compile one or more reference nodes for the vGPS data 600 based on an order identifier 602 of the sentence 606, and the one or more sets of coordinates 608, 610, and 612.

It may also be challenging to consider, during the creative process, whether a character location with respect to the story plot is feasible. For example, may a character be in New York at 4 am, and then appear in Paris at 6:30 am the same day? These types of details may become lost in a complicated storyline. Accordingly, it may be advantageous to provide virtual maps configured to automatically track an author's story plot and display virtual representations of the characters on the interactive map, and make automatic determinations regarding the feasibility of character movements and positions with respect to story and/or plot context. It may also be advantageous to provide means for virtual GPS mapping of interactive books such as eBooks.

In other aspects, as a book is written (or during some point after its authoring and editorial process) mapping engine 210 may prompt for user input regarding the creation of the vGPS-channels. For example, mapping engine may prompt for user input regarding the initial character locations, receive the input, and save the input as respective vGPS data for the characters as each are introduced in the text. Accordingly, in subsequent sentences when a character moves, mapping engine 210 may prompt for new coordinates to be associated with the respective portion of the story plot, and record the coordinates as vGPS data.

According to some embodiments, mapping engine 210 may parse surrounding sentences (adjacent) to the present sentence under analysis to determine whether any time or distance movements are implied or explicitly described. If no time or an insignificant duration of time or indication of distance is indicated, then mapping engine 210 may infer the location of a predicate noun (a place) to be an alias of the most recent known location (e.g., the place) of a particular character. For example, a portion of text may read, "George met Sally at the YMCA. After a brief conversation George swam 20 laps in the pool." In this example not much time has elapsed between the two events (e.g. the brief conversation). Accordingly, in some embodiments, mapping engine 210 may determine that the place called "pool" could be inferred to be the same location as the place called "YMCA." Accordingly, mapping engine 210 may attribute and record known coordinates for YMCA to the pool (which may be the same coordinates).

In other embodiments, mapping engine 210 may check whether certain indications of travel or location are feasible with respect to context of a story plot. For example, mapping engine 210 may request input for character limits, e.g., "character X can only travel 3 mph average but character Y can travel 60 mph average, since Y is in an automobile." In other aspects, mapping engine 210 may apply limits to characters over time, for example, character X may have a bike in one scene but a trans-dimensional spacecraft in another. Accordingly, mapping engine 210 may output an indication of an inconsistency. In some aspects, mapping engine may determine whether a scenario where a character travels to a location faster than their limits allow for any given time frame exceeds allowable travel rules, as indicated above. This information may be useful for an author's validation to check the accuracy and/or believability of their story line in relation to character location.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for displaying a created map for a plurality of characters in a story, comprising:
    creating a map for a story plot, the creating comprising:
        adding coordinate values to one or more locations on the map, wherein the map includes a compiled virtual global positioning system (GPS) data map and a GPS channel for each character of the plurality of characters from a beginning of the story through an end of the story;
        parsing a text of the story to identify instances of the one or more locations, wherein the parsing includes determining a subject, verb, and predicate noun of each sentence;
        compiling a virtual GPS reference node for each sentence based on the parsing; and
        associating each instance of the one or more locations with a scale for the map;
    receiving an indication of a user position in the story plot;
    determining a first set of the coordinate values on the map for a character of the plurality of characters in the story plot with respect to the user position;
    determining a second set of the coordinate values based on a predicate from the determined subject, verb, and predicate noun of each sentence in the story;
    animating a change of position of the character of the plurality of characters in the story plot from the first set of the coordinate values to the second set of the coordinate values based on the predicate from the determined subject, verb, and predicate noun of each sentence; and
    displaying the map with the character of the plurality of characters in the story plot represented on the map according to the first set of the coordinate values and the second set of the coordinate values.

2. The computer-implemented method of claim 1, wherein the user position in the story plot is indicated by a page number or sentence number.

3. The computer-implemented method of claim 1 further comprising compiling virtual GPS data for the plurality of characters based on a determined relevance to the user position in the story.

4. The computer-implemented method of claim 1, further comprising displaying the map with the plurality of characters in the story plot represented on the map according to a determined set of the coordinate values for each of the plurality of characters.

5. The computer-implemented method of claim 4, wherein displaying the map with the plurality of characters comprises:
 outputting the map to an operatively connected output device.

6. A system for displaying a created map for a plurality of characters in a story, comprising a processor operatively connected to a computer memory, the processor configured to;
 create a map for a story plot and save the map to the computer memory, wherein the creating comprises;
  adding coordinate values to one or more locations on the map, wherein the map includes a compiled virtual global positioning system (GPS) data map and a GPS channel for each character of the plurality of characters from a beginning of the story through an end of the story;
  parsing a text of the story to identify instances of the one or more locations, wherein the parsing includes determining a subject, verb, and predicate noun of each sentence;
  compiling a virtual GPS reference node for each sentence based on the parsing; and
  associating each instance of the one or more locations with a scale for the map;
 receive an indication of a user position in the story plot;
 determine a first set of the coordinate values on the map for a character of the plurality of characters in the story plot with respect to the user position;
 determine a second set of the coordinate values based on a predicate from the determined subject, verb, and predicate noun of each sentence in the story;
 animate a change of position of the character of the plurality of characters in the story plot from the first set of the coordinate values to the second set of the coordinate values based on the predicate from the determined subject, verb, and predicate noun of each sentence; and
 display the map with the character of the plurality of characters in the story plot represented on the map according to the first set of the coordinate values and the second set of the coordinate values.

7. The system of claim 6, wherein the user position in the story plot is indicated by a page number or sentence number.

8. The system of claim 6, wherein the processor is further configured to compile virtual GPS data for the plurality of characters based on a determined relevance to the user position in the story.

9. The system of claim 6, wherein the processor is further configured to display the map with the plurality of characters in the story plot positioned on the map according to a determined set of the coordinate values for each of the plurality of characters.

10. The system of claim 6, wherein the processor is further configured to:
 output the map to an operatively connected output device.

11. A non-transitory computer-readable storage medium storing computer-executable instructions for execution by a processor to perform a method, the method comprising:
 creating a map for a story plot, the creating comprising:
  adding coordinate values to one or more locations on the map, wherein the map includes a virtual global positioning system (GPS) data map and a GPS channel for each character of the plurality of characters from a beginning of the story through an end of the story;
  parsing a text of the story to identify instances of the one or more locations, wherein the parsing includes determining a subject, verb, and predicate noun of each sentence;
  compiling a virtual GPS reference node for each sentence based on the parsing; and
  associating each instance of the one or more locations with a scale for the map;
 receiving an indication of a user position in the story plot;
 determining a first set of the coordinate values on the map for a character of the plurality of characters in the story plot with respect to the user position;
 determining a second set of the coordinate values based on a predicate from the determined subject, verb, and predicate noun of each sentence in the story;
 animating a change of position of the character of the plurality of characters in the story plot from the first set of the coordinate values to the second set of the coordinate values based on the predicate from the determined subject, verb, and predicate noun of each sentence; and
 displaying the map with the character of the plurality of characters in the story plot represented on the map according to the first set of the coordinate values and the second set of the coordinate values.

12. The non-transitory computer-readable storage medium of claim 11, wherein the user position in the story plot is indicated by a page number or sentence number.

13. The non-transitory computer-readable storage medium of claim 11, further comprising compiling virtual OPS data for the plurality of characters based on a determined relevance to the user position in the story.

14. The non-transitory computer-readable storage medium of claim 11, further comprising displaying the map with the plurality of characters in the story plot represented on the map according to a determined set of the coordinate values for each of the plurality of characters.

* * * * *